United States Patent Office 3,137,346
Patented June 16, 1964

3,137,346
METHOD OF TREATING WELLS
Ian C. McLennan, Maracaibo, Venezuela, assignor to Shell Oil Company, New York, N.Y., a corporation of Delaware
No Drawing. Filed Dec. 5, 1960, Ser. No. 73,513
Claims priority, application Trinidad Dec. 9, 1959
20 Claims. (Cl. 166—20)

The invention relates to well installations traversing earth formations and pertains more particularly to a method of preventing the entry of particles from a producing formation into a well which is in communication with the formation, without blocking the flow of fluid out of the formation into the well.

In particular wells surrounded by an unconsolidated or substantially unconsolidated formation, when being used for the production of oil, gas or water from this formation, are plugged very quickly, as part of the unconsolidated or poorly consolidated material which constitutes the formation is entrained by the fluid flowing into the well. The coarsest particles of this material passing into the well oftentimes cannot be lifted by the fluid flowing upwardly in the well, and are deposited at the bottom of the well. This accumulation of particles greatly reduces the rate of production, which finally results in a complete stoppage thereof. At this stage the well has to be cleaned out before further production can be obtained. In some cases, it is even impossible to produce the well economically owing to the large quantities of sand entering the well.

A further drawback which is encountered, when producing fluid from formations consisting of loose or poorly consolidated material, is formed by the finest particles, which remain suspended in the fluid when flowing upwards in the well and are finally produced at the well head, causing increased abrasion of metal parts and frequent clean-outs of production service equipment such as liquid/gas separators and tanks.

The object of the invention is to provide a method for treating wells of the above-mentioned type in such a way that the particles from the partly or incompletely consolidated producing formation are prevented from entering the well.

According to the invention, a rigid filter is formed in the passage(s) leading from the formation to the interior of the well, which filter is constituted by a permeable, elastic material reinforced by hardened resin.

Preferably, pieces of permeable, elastic material are impregnated with a hardenable resin and transported by means of a carrier fluid down the well and into the passage(s) leading from the unconsolidated formation to the interior of the well, after which the resin hardens—whilst the pieces are kept in a slight compression—so as to reinforce the permeable, elastic material and bond together adjacent pieces thereof.

As the pores and the passages between the pores in the permeable material have to remain open to a certain extent in order to allow the fluid to pass through the rigid filter formed, the resin filling up said pores, after the material is impregnated therewith, has to be partly removed therefrom. To that end the permeable, elastic material, after being impregnated with resin, may be squeezed out to such an extent that only part of the resin originally present in the pore space of the permeable, elastic material is retained therein. In another way the superfluous quantity of resin may be removed by passing a fluid through the pores of the material after the pieces have arrived in the said passage(s). In both cases there remains an adequate amount of resin in the pores of the permeable material. In still another way the hardenable resin may be dissolved in a solvent before impregnating the permeable, elastic material therewith. On hardening, the resin is precipitated on the walls of the pores.

In the event that a resin is used which has to be hardened by a curing agent, the said curing agent may be mixed with the resin before the material is impregnated therewith. In that case, however, care has to be taken that the transport of the pieces to the bottom of the well does not take too long, as otherwise a premature hardening of the said pieces will occur. In another way this premature hardening can be prevented by cooling the carrier fluid and the permeable material carrying resin and curing agent before injecting them into the well.

In another way the curing agent can be added to the resin after the pieces of permeable, elastic material impregnated with the resin have arrived in the passage(s) leading from the formation to the interior of the well.

In this latter method the unhardened resin can either partly or completely fill the pores of the material. In the latter case, the superfluous quantity of resin is flushed from the pores by a fluid, which may be e.g. a solution of the curing agent, or the carrier liquid followed by a solution of the curing agent. After this flushing that part of the resin which is retained in the pores is hardened by the curing agent present in the pore-spaces.

In still another way, when the well is provided with a liner or casing having perforations facing the unconsolidated formation, the majority of the pieces of permeable, elastic material have such dimensions that they have to be forced through said perforation by the carrier fluid. After the said pieces have passed through the perforations, the injection of carrier fluid is stopped, and the well is allowed—before the hardening of the resin takes place—to produce at a rate which is smaller than the rate at which the carrier fluid has been injected.

Although the use of a permeable, elastic material having a fine cell structure (i.e., having cells or pores having a diameter lying within the range of ¼ to ½ millimeters) is preferred; it is also possible to use materials having cells or pores of which the diameter lies within the range of 1 to 5 millimeters. In order to improve the filter action of such material having a large cell structure, the pore spaces of this material are then filled up with sand particles or ground nut shells, such as ground walnut or coconut shells, before or during the impregnation with a resin and a suitable curing agent.

In all the above-mentioned methods there is obtained— due to the reinforcement of the elastic material by the hardening of the resin—a rigid filter which can withstand high formation loads without being compressed to such an extent that the permeability of the filter is materially decreased. The permeable, elastic material is preferably constituted by a foam plastic, such as a polyurethane. The resin used may be an epoxy resin, in which case there is preferably used an epoxy resin obtained by reacting diphenylol propane with an excess of epichlorohydrin in alkaline medium, which resin has a molecular weight of 350–400 and contains an average of 1.85 epoxy groups per molecule. In this latter case diethylene triamine is preferably used as a curing agent.

So as to be readily available, the pieces of permeable, elastic material impregnated with resin may be stored in combination with a fluid suitable to act as a carrier medium for transporting the said pieces through a well bore. In this impregnated condition, the resin can either fill the pore space completely or only partly.

The size of the pieces used depends on the passage(s) they have to pass in order to arrive in the passage(s) between the unconsolidated formation and the interior of the well. Thus, in the event that e.g. a liner provided with perforations having a diameter of 1.25 centimeters is arranged in the well and facing the unconsolidated formation, pieces having outer dimensions of 2 x 2 x 0.5 centimeters may be used. Such pieces can quite easily pass through the perforations under a slight pressure difference existing across the perforations, as long as the resin is not hardened. After hardening of the resin, the elasticity of the material from which the pieces are manufactured is lost, and the pieces cannot be entrained through the perforations into the well by the flow of production fluid.

The way in which the rigid filter constituted by the reinforced, permeable material is formed will depend on the dimensions of the cavity which is present in the formation around the normal or drilled diameter of the well. If the space left between the wall of the cavity and the outer wall of the tubing, casing or liner in the well is quite large, the pieces will be pressed against the wall of the cavity to form a sheath thereon which fully cover the surface thereof. When hardening, the resin not only reinforces the said pieces, but also bonds adjacent pieces together, thus forming a rigid structure which fully obstructs the entry of particles from the formation into the interior of the well, while providing a passage for the production formation fluid to be produced.

If the well has not yet been producing for a long time, the above-mentioned cavity will in most cases be very small, and sometimes even will be constituted of only small local cavities facing the perforations provided in the tubing or casing arranged in the well. When such is the case, the pieces of elastic, permeable material are pressed through the perforations into the said cavities by the carrier liquid. By passing through the perforations, the pieces are compressed, as they are somewhat larger in dimension than the perforations, but afterwards they expand substantially to their original form, thus filling up the said local cavities. On hardening of the resin, the pieces located in each cavity are reinforced and bonded together, thus forming a number of small filters of rigid material, which will not be carried back into the well even by a large flow of fluid passing out of the formation into the well.

A preferred method of practicing the present invention for the prevention of the entry of sand through the perforations provided in the liner of an oil well will be described hereinafter.

A material or mixture capable of reaction to form an oil-insoluble hardened resin, such as an epoxy resin, is mixed with a suitable curing agent so as to form a solution. Pieces of a permeable, elastic material, such as a foam plastic having fine cells of a diameter between ¼ and ½ millimeter are formed, the dimensions of the said pieces depending on the dimensions of the perforations provided in the casing or liner which they have to pass. Preferably these dimensions are so chosen that the pieces have to be pressed through the said perforations by the carrier fluid at a small pressure difference, e.g. in the order of 5 kilograms per square centimeter. These pieces are impregnated at the wellhead with the above-mentioned solution of resin and curing agent, and subsequently squeezed out to such an extent that an adequate quantity of the solution is retained in the pore space of the said foam plastic.

It is to be noted that most of the cells of foam plastic having cells of a diameter in the above-mentioned range will communicate with each other. If this is not the case, the foam plastic must be compressed after manufacture. As a result of this most of the cell walls will break, and a permeable mass will be obtained. It has been found that a polyurethane foam having a cell diameter in the range of ¼ to ½ millimeter showed a permeability of 2.4 darcies, which could be increased to 4.2 darcies by compressing the said foam in air, and to 19 darcies by compressing the said foam in water. It is remarked in this connection that a porous mass is said to have a permeability of 1 darcy when a single-phase fluid of 1 centipoise viscosity that completely fills the voids in the mass will flow through it under "conditions of viscous flow" at a ratio of 1 cubic centimeter per second per square centimeter of cross-sectional area under a pressure or equivalent hydraulic gradient of 1 atmosphere (76.0 centimeters Hg) per centimeter.

After the squeezing out of the superfluous quantity of the solution, the pieces of permeable, elastic material are mixed with a carrier liquid which preferably is of such a type that it does not contaminate or in any way adversely affect the permeability of the formation. Preferably, a charge of crude oil is chosen to act as a carrier liquid. This liquid is then pumped down into the well under a pressure higher than the formation pressure increased by the pressure losses due to the flow of liquid through the well or the tubing therein. This supply pressure remains substantially the same until the pieces which are transported by the liquid arrive at the perforations of the liner or casing facing the formation from which the loose sand is produced. Then the supply pressure applied to the top of the well generally has to be increased in order to press or pump the pieces through the said perforations. As a result the pieces are compressed, but owing to the elasticity of the material of which they are composed, they regain their original dimensions when they have passed through the perforations.

Various quantities of permeable, elastic material can be used for the formation of a rigid filter in the passage(s) leading from the formation to the interior of the well. In case that the cavity formed around the perforated liner or casing is relatively small, the quantity of permeable, elastic material may be chosen such that the whole of the cavity is filled up with this material to such an extent, that the pieces of the permeable, elastic material are under a slight compression. Then on hardening of the resin, which takes place after stopping the injection of carrier fluid, adjacent pieces are bonded together without leaving any channels therebetween and thus forming a cylindrical filter bonded to the outer wall of the perforated casing or liner. In the event that a relative large cavity is present around the perforated liner or casing, the quantity of permeable elastic material has to be sufficient to cover the whole surface of the cavity. In this case the injection of carrier fluid, or another fluid has to be continued during the hardening of the resin, whereby the pieces of permeable, elastic material are pressed against the cavity wall, as well as against each other so that the formation of channels between the pieces during the hardening of the resin is prevented. Thus, a rigid filter or sheath is formed covering the whole surface of the cavity which is bonded to the liner or casing at the spot where it enters the cavity. It is also possible to use a relative small quantity of permeable, elastic material, this quantity being sufficient to form clusters over the outer side of the perforations. In this latter method, the well is brought into production after the pieces of permeable, elastic material have been forced through the perforations and have gathered in the cavity. The flow of fluid then passing out of the formation and into the interior of the casing or liner via the perforations provided therein, sweeps the pieces to the outer part of said perforations. As the dimensions of the said perforations are somewhat smaller than the dimensions of the majority of the pieces or permeable, elastic material, these pieces cluster over and around the outer side of the perforations. The flow resistance of the production fluid in the said material raises a certain pressure difference over the said perforations and care has to be taken that this pressure difference does not exceed the pressure difference occurring over the perforations during the period that the pieces of permeable elastic material have been passed therethrough to the outside of the casing or liner by the carrier fluid. The production rate has to be chosen smaller than the injection rate of the carrier fluid. As the pieces are slightly compressed by the pressure difference created across them by the production fluid, a firm bond is obtained between adjacent pieces and between the wall of the liner or casing and the pieces on hardening of the resin to form a filter sheath over the outside of the liner or individual sheaths over each perforation therein. In all the above-mentioned methods there has to be no fear that the pieces of permeable, elastic material, once being reinforced by the hardened resin, will be carried away by the production fluid, as the filter or filters formed by the bonding of the pieces will be greater than the size of the perforations. It is understood that pieces smaller than the perforations may be employed to create a sheath as they cannot return to the liner or casing after they become bonded together.

It will be clear that the various time factors which play a roll in this process are preferably predetermined in the laboratory, where the conditions of flow and pressure in the well as well as the conditions in the formation cavity can be simulated.

It has been found that when using an epoxy resin obtained by reacting glycerol with an excess of epichlorohydrin in an alkaline medium and having a molecular weight of 300 and containing an average of 2 epoxy groups per molecule, in combination with 1 cyclo hexyl amino-3-amino propane as a curing agent, for impregnating a polyurethane foam having a cell diameter in the range of ¼ to ½ millimeter and a permeability of 19 darcies and extruding the pieces made of the said foam until there remained 0.35 gram of resin per cubic centimeter of uncompressed foam, the permeability of the filter thus formed after hardening of the resin rated 10 darcies.

By passing a mixture of crude oil with a fine sand (originating from Oude Pekela in the Netherlands), of which 50% of the particles were smaller than 0.12 millimeter, through the filter formed in the above-mentioned way, it was found that all the sand particles were retained by the filter while the oil passed through it. Although the cell diameter is greater than the particle size of the sand, these sand particles are prevented from passing through a filter having such a cell diameter, as the passages provided in the membranes between the cells are much smaller than the said particles.

It was further found that good results could be obtained by using an epoxy resin obtained by reacting diphenylol propane with an excess of epichlorohydrin in an alkaline medium and having a molecular weight of 350–400 and containing an average of 1.85 epoxy groups per molecule, in combination with diethylene triamine as a curing agent and a fine cell (cell diameter ¼ to ½ millimeter) polyurethane foam as the permeable, elastic material. During the curing of the resin, the pieces of the permeable material swell up, their volume increasing 33 to 100%. This swelling is to be considered as an advantage, since it increases the degree to which the passages between the formation and the well are filled up with filtering material.

As another example of the present invention the use of pieces of permeable, elastic material, the pore space of which is completely or substantially completely filled with a mixture of resin and curing agent, and which are transported down the well in an uncompressed condition, can be mentioned.

When passing through the perforations, if present, these pieces are partly squeezed out, whilst the superfluous quantity of solution present in the cells or pores of the permeable, elastic material is flushed out of said pores when the said pieces are pressed against the formation wall by the carrier liquid passing into the formation. The said carrier liquid then passes through the pores, thus washing the pore spaces to such an extent that a certain amount of the solution remains in the pore space. The resin in this solution hardens through the action of the curing agent and bonds the pieces together, at the same time reinforcing the material. The washed-out part of the solution is carried into the formation and hardens there without creating a substantial reduction in the overall permeability of the formation.

It will be clear that where there are no perforations which have to be passed by the pieces, i.e. when the pieces pass out the open end of a pipe string or a hole in the wall thereof, the superfluous quantity of the solution is washed out of the pores by the action of the carrier liquid passing through them when the pieces are pressed against the formation wall.

Another way of practicing the invention is to impregnate the pieces of permeable, elastic material with resin only. Hereby one or several charges of the pieces are supplied to a carrier fluid while the latter is being introduced into the hole. After the last charge, the injection of carrier liquid, which may be—in the event of an oil well—crude oil or gasoline, is continued for some time, after which a charge of curing agent in liquid form is introduced into the hole. Upon the arrival of the pieces of permeable, elastic material in the passage(s) leading from the interior of the well to the formation, they accumulate there. As these pieces cannot pass into the formation, the pore-spaces of this material are washed out by the quantity of carrier fluid which has been supplied to the well after the last charge of permeable, elastic material, whereby only part of the resin originally present in the pore spaces is left in the pore space of the permeable, elastic material. On the arrival of the curing agent at the location(s) where the pieces are accumulated, the carrier fluid is replaced by the curing agent. Before the charge of curing agent, which is followed by a charge of crude oil or other driving medium, has passed through the pores, the injection is stopped. This moment can be calculated, since the volume of the well bore and the injection rate are known. The curing agent is now in contact with the resin present in the pores, and the hardening of the resin resulting therefrom bonds adjacent pieces together, at the same time rigidifying them into an incompressible, permeable mass, which obstructs the entry of sand through the passage(s) leading from the formation to the interior of the well bore, but does not prevent the passage of oil produced from the formation. As the hardening takes place without a flow of fluid pressing the pieces together and to the wall of the bore hole or cavity around the bore hole, this latter method should only be used if the conditions in the lower part of the bore hole are such that the pieces of permeable, elastic material are—with the resin in an unhardened condition—slightly compressed into a space which is smaller in volume than the amount of uncompressed elastic material. In this case the pieces of permeable, elastic material are in close contact with each other during the hardening process, so that a flow of curing agent through the pieces—which would otherwise be required for pressing the pieces together and against the cavity wall—is not required, thus reducing the cost of this operation. As by this method the resin and the curing agent are separately supplied, a premature hardening of the resin cannot occur.

If required, the last charge of permeable, elastic material, which is followed in the above-described process by a temporarily continued injection of carrier medium, can be directly followed by an injection of curing agent, which curing agent on arrival at the bottom of the well washes the superfluous amount of resin from the pore spaces and, after the flow has been stopped, remains in the pore spaces for hardening the resin present on the pore walls.

After hardening, the curing agent is removed by the production fluid which flows out of the well, and passes via the filter into the well.

If the available permeable, elastic material has a cell diameter or pore diameter which is too large to form an obstruction for the sand particles entrained with the flow of produced fluid, the filter action of this material can be greatly increased by mixing the resin/curing agent solution with sand particles before applying it to the material, or by filling the pore space of the permeable, elastic material with sand particles before this material is impregnated with a resin/curing agent mixture. The pieces thus treated are transported to the bottom of the hole by means of a carrier medium. A flow of the carrier medium through the pores of the material when it arrives in the passage(s) between the interior of the well and the formation should be prevented, as otherwise a flushing of the sand particles from the pores could occur. In order to obtain a coherent filter structure, the material thus treated should preferably be applied to the wall of the formation via a number of perforations provided in a liner and in such a quantity that cavity around the liner is filled up to such an extent with the elastic material that this material is slightly compressed.

In case that the permeable, elastic material is impregnated with a mixture of a resin and a curing agent, it may be, in case deep wells have to be treated, of advantage to cool the permeable, elastic material, as well as the carrier fluid used for transporting the said material. By this decrease in temperature, the action of the curing agent is retarded, whereby the time available for transporting the pieces of permeable, elastic material carrying the resin/curing agent mixture without fear for a premature hardening of the resin, is materially increased.

While only a limited number of modifications of the present invention have been described in detail, it will be understood that the invention is not limited thereto, since many modifications can be made, and it is therefore contemplated to cover by the appended claims any such modifications as fall within the true spirit and scope of the invention.

I claim as my invention:

1. The method of preventing the entry of earth formation particles from a producing formation into a well which is in communication with said formation, without blocking the flow of fluid from said formation into said well, said well being provided with at least one pipe string having at least one fluid entry therein within the well, said method comprising adding pieces of a permeable, elastic material to a carrier fluid, pumping the carrier fluid and material down the well through the pipe string and discharging it therefrom at a point adjacent the producing formation, creating and applying a pressure differential within the well to cause the pieces of material to press together and form a permeable elastic sheath within the well, said sheath being positioned between the producing formation and the entry to the pipe string, and treating said elastic sheath in a manner to create a fluid-permeable rigid form which is impermeable to earth formation particles.

2. The method of claim 1 including the step of at least partially impregnating the pieces of permeable elastic material with a hardenable resin prior to adding the pieces to the carrier fluid, and wherein the elastic sheath is treated by maintaining the pieces of material in the form of a sheath for a time sufficient for the resin impregnated pieces to harden in a rigid mass.

3. The method of claim 2 wherein the hardenable resin is dissolved in a solvent at the time the pieces of elastic material are at least partially impregnated with it.

4. The method of claim 2 wherein the hardenable resin is combined with a curing agent prior to impregnating the pieces of elastic material.

5. The method of claim 4 including the step of cooling the carrier fluid and the at least partially impregnated pieces of material before pumping them down the well to prevent premature setting of the resin.

6. The method of claim 2 wherein a resin hardenable by a curing agent is employed with the step of treating the elastic sheath being carried out by pumping a curing agent down the pipe string into the well to contact the sheath formed therein and harden the resin carried thereon.

7. The method of claim 1 wherein the pressure differential created within the well exists across the face of the formation so that the pieces of elastic material form a sheath thereon.

8. The method of claim 1 wherein at least some of the openings in the pieces of permeable elastic material contain particles of ground nut shells at the time they are pumped down the well.

9. The method of claim 1 wherein at least some of the openings of the permeable elastic material contain particles of sand at the time they are pumped down the well.

10. The method of claim 2 including the step of passing a fluid through the pores of the pieces of permeable material making up the sheath to remove part of the resin therein before hardening the resin-containing sheath.

11. The method of preventing the entry of earth formation particles from a producing formation into a well which is in communication with said formation, without blocking the flow of fluid from said formation into said well, said well being provided with at least one pipe string having a plurality of perforations therein within the well at the level of said producing formation, said method comprising adding pieces of a permeable elastic material to a carrier fluid, said pieces of material being at least partially impregnated with a hardenable resin, pumping the carrier fluid and material down the well through the pipe string and through the perforations in the pipe string, creating and applying a pressure differential within the well to cause the pieces of material to mass together and form a permeable elastic sheath within the well, said sheath being positioned between the producing formation and the entry to the pipe string, and treating said elastic sheath in a manner to create a fluid-permeable rigid form which is impermeable to earth formation particles.

12. The method of claim 11 wherein the pressure differential created within the well exists across the perforated section of the pipe string so that the pieces of elastic material cover the perforations, a major portion of said pieces of material in their normal condition being of a size greater than the size of the perforations.

13. The method of claim 11 wherein the combined volume of the pieces of material pumped through the perforations in the pipe string forms a sheath filling the space between the section of perforated pipe string and the wall of the well.

14. The method of claim 11 including the step of keeping the mass of pieces of elastic material forming the sheath under a slight compression as the sheath hardens.

15. The method of claim 11 including the steps of originally impregnating the pieces of permeable elastic material with a hardenable resin and then squeezing out some of the resin from the elastic material before it is added to the carrier fluid.

16. The method according to claim 11 wherein a curing agent is used to harden the resin.

17. The method of claim 11 wherein the pieces of permeable elastic material are a polyurethane foam plastic.

18. The method of claim 11 wherein the resin is an epoxy resin.

19. The method of claim 10 wherein the fluid is the same composition as the carrier fluid.

20. The method of claim 10 wherein the fluid is a solution of a curing agent.

References Cited in the file of this patent

UNITED STATES PATENTS

| | | |
|---|---|---|
| 2,815,815 | Hower et al. | Dec. 10, 1957 |
| 2,823,753 | Henderson et al. | Feb. 18, 1958 |
| 2,941,594 | Ladd et al. | June 21, 1960 |
| 3,005,492 | Mathieson et al. | Oct. 24, 1961 |